(No Model.)
P. DONOHUE.
HARNESS SADDLE AND ATTACHMENT.
No. 428,167. Patented May 20, 1890.
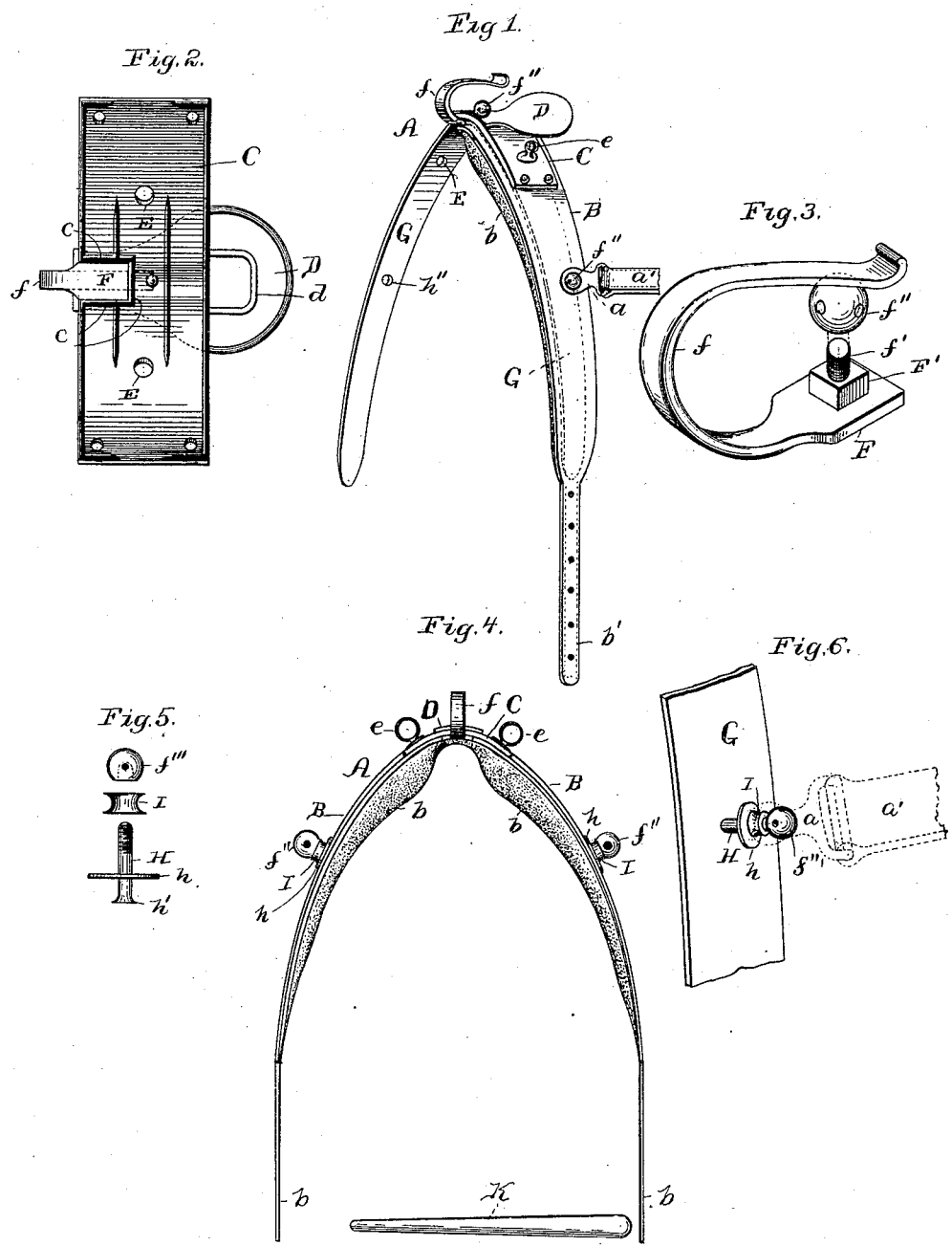
Witnesses
R. A. Balderson
E. E. Todd
Inventor
Patrick Donohue
By his Attorneys
Higdon & Higdon

UNITED STATES PATENT OFFICE.

PATRICK DONOHUE, OF KANSAS CITY, MISSOURI.

HARNESS-SADDLE AND ATTACHMENT.

SPECIFICATION forming part of Letters Patent No. 428,167, dated May 20, 1890.

Application filed March 1, 1890. Serial No. 342,205. (No model.)

*To all whom it may concern:*

Be it known that I, PATRICK DONOHUE, of Kansas City, Jackson county, Missouri, have invented certain new and useful Improvements in Harness-Saddles and Attachments, of which the following is a full, clear, and exact description, reference being had to the accompanying drawings, forming a part hereof.

My invention relates to improvements in harness-saddles and attachments; and it consists in the novel construction and arrangement hereinafter fully set forth and described.

In the drawings which illustrate the manner of carrying out my invention, Figure 1 is a perspective view of my improved saddle, showing one side upholstered and provided with attachments, and the other side showing the steel rib over which said upholstering is secured. Fig. 2 is an inverted plan view of the angle-plate which fits over the top of saddle, to which is secured the rein-hook. Fig. 3 is a detail perspective of said rein-hook, showing the bolt and nut by which it is secured in said angle-plate. Fig. 4 is a front view of the saddle, showing it completed and provided with my attachments. Fig. 5 is a detail view showing the nut, collar, bolt, and washer secured to the saddle which carry the side straps $a'$; and Fig. 6 is a broken-off perspective view of the steel rib G, showing the bolts and nuts in position and the side strap $a'$ in dotted lines.

Referring to the drawings by letter, A represents my invention; B, the leather covering, which is secured over the steel ribs G, which form the saddle, said covering B being provided at its lower extremities with suitable straps $b'$, by which said saddle is secured around the horse. C is an angular metallic plate secured on the top of said saddle, having the rein-eyes $e$ passing through it, which are rigidly secured in the metallic rib G. D is a metallic saddle rigidly secured on the top of said angle-plate C by rivets. This saddle D and angle-plate C are provided with a square hole, in which the lug F' fits tightly, said lug F' being wrought rigidly with the flat projections F of the rein-hook $f$. Extending upward from said lug F' is a bolt $f'$, over which is secured the circular nut $f''$. This is for the purpose of holding the rein-hook rigid and preventing it from working loose and rattling. On the under side of the angle-plate C a recess is formed by the raised ridges $c$ to receive the flattened end F of the rein-eye $f$. Said flattened end F fits snugly in the recess, and the lug F', passing through the square hole in the saddle-plate D, causes said rein-eye to remain rigid. The metallic steel rib G is shown in Fig. 1 to give proper shape and strength to the saddle, also to form suitable bearings in which the rein-eyes $e$ and strap-bolts H may be secured.

H is a bolt which passes through the perforations $h''$ of the metallic rib G, having the flanged head $h$, which prevents it from pulling through said rib, and at the same time preventing the saddle from having an uneven surface on the inside.

$h$ is a washer which fits over the covering B. On this washer $h$ the flanged collar I rests. This flanged collar I is to receive the clevis $a$, which is secured to the shaft-supporting strap $a'$, the flanges preventing said clevis from slipping off. The nut $f'''$ is then secured tightly over bolt H, thus holding said clevis in position. K shows a pin by which these nuts $f''$ and $f'''$ may be operated. This, however, I do not claim as being a part of my invention, as said bolts may be operated by wrenches made for that purpose. These nuts $f''$ and $f'''$ may be composed of brass, nickel, or any other ornamental material, and will give the harness an ornamental appearance, and at the same time they are so situated on the saddle that any of the parts may be tightened at any time without ripping any of the linings or coverings from said harness.

The steel rib G passing the entire length of the saddle keeps it in proper shape and prevents the hollow of the saddle from bearing on the horse's back, and the rein-hook $f$, having the lug F' extending upwardly and secured on the outside of the saddle, presents a smooth surface on the under side, thereby causing no irritation on the back of the horse.

Having thus described my invention, what I claim as new, and desire to secure by Letters Patent, is—

1. In a harness-saddle, the steel rib G, extending the entire length of the saddle, plate C, ridges $c$ on said plate C, forming a recess, the hook $f$, having a flattened part F, which engages said recess, a lug F' on said flattened part F, a bolt $f'$, secured in said lug F', said bolt and lug extending up through plate C and saddle D, and a circular nut $f''$, which engages bolt $f'$ and secures the parts together, substantially as described.

2. In a harness-saddle, the bolt H, washer $h$, collar I, and circular nut $f'''$, substantially as described.

3. A saddle having the rein-eye $f$ secured in the saddle-plate D and angle-plate C by means of lug and bolt fastened by a nut $f''$, together with the bolt H and washer $h$, flanged collar I and nut $f'''$, operating in combination with the steel rib G, which causes the saddle to retain its normal shape and prevent the same from dropping down upon the horse's back, substantially as set forth and described.

In testimony whereof I affix my signature in presence of two witnesses.

PATRICK DONOHUE.

Witnesses:
GEO. Y. THORPE,
A. A. HIGDON.